United States Patent
Rowitch et al.

(10) Patent No.: US 10,237,697 B2
(45) Date of Patent: Mar. 19, 2019

(54) LOCATION BASED SERVICE (LBS) SYSTEM, METHOD AND APPARATUS FOR TRIGGERING OF MOBILE STATION LBS APPLICATIONS

(71) Applicant: QUALCOMM Incorporated, San Diego, CA (US)

(72) Inventors: Douglas Neal Rowitch, Honolulu, HI (US); Kirk Allan Burroughs, Alamo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/166,008

(22) Filed: May 26, 2016

(65) Prior Publication Data
US 2016/0277896 A1    Sep. 22, 2016

Related U.S. Application Data

(63) Continuation of application No. 14/453,517, filed on Aug. 6, 2014, now abandoned, which is a
(Continued)

(51) Int. Cl.
*H04W 4/02* (2018.01)
*H04W 4/14* (2009.01)
(Continued)

(52) U.S. Cl.
CPC .......... *H04W 4/025* (2013.01); *H04W 4/023* (2013.01); *H04W 4/14* (2013.01); *H04W 12/06* (2013.01); *H04W 12/08* (2013.01); *H04W 64/00* (2013.01)

(58) Field of Classification Search
CPC ..... H04W 88/02; H04W 84/02; H04W 64/00; H04W 76/007; H04W 8/245; H04W 4/12;
(Continued)

(56) References Cited

U.S. PATENT DOCUMENTS

| 4,445,118 A | 4/1984 | Taylor et al. |
| 5,589,835 A | 12/1996 | Gildea et al. |

(Continued)

FOREIGN PATENT DOCUMENTS

| JP | 2002366529 | 12/2002 |
| KR | 20020094385 A | 12/2002 |

(Continued)

OTHER PUBLICATIONS

3GPP2 C.S0022-0, Version 3.0, 3rd Generation Partnership Project 2 "3GPP2", "Position Determination Service Standard for Dual Mode Spread Spectrum Systems," Feb. 16, 2001.
(Continued)

*Primary Examiner* — George Eng
*Assistant Examiner* — Umair Ahsan
(74) *Attorney, Agent, or Firm* — Kilpatrick Townsend & Stockton (57) ABSTRACT

An application executed within a mobile station to be triggered only by a network element, such as a mobile positioning center (MPC) or a Mobile Center (MC). The network element is coupled to a base station. The network element is responsible for authorizing an application that is either resident within the mobile station or that is run in a device that is resident elsewhere in the network. The mobile station communicates with the network element over a communication session through the base station and other infrastructure components. The mobile station initiates a mobile originated positioning session over a second communication session with a positioning assistance server.

20 Claims, 5 Drawing Sheets

Related U.S. Application Data continuation of application No. 12/404,151, filed on Mar. 13, 2009, now Pat. No. 8,938,253, which is a continuation of application No. 10/770,878, filed on Feb. 2, 2004, now Pat. No. 7,505,757.

(60) Provisional application No. 60/445,815, filed on Feb. 5, 2003, provisional application No. 60/444,248, filed on Jan. 31, 2003.

(51) Int. Cl.
*H04W 12/06* (2009.01)
*H04W 12/08* (2009.01)
*H04W 64/00* (2009.01)

(58) Field of Classification Search
CPC ......... H04L 29/08108; H04L 29/08081; H04L 29/06034; H04L 29/08135; H04L 12/5895; H04M 1/72525; H04M 3/42178; H04M 1/72547; H04M 1/72522; G08B 25/016
See application file for complete search history.

(56) References Cited

U.S. PATENT DOCUMENTS

| | | | |
|---|---|---|---|
| 5,841,396 A | 11/1998 | Krasner | |
| 5,872,539 A | 2/1999 | Mullen | |
| 5,913,170 A | 6/1999 | Wortham | |
| 5,999,125 A | 12/1999 | Kurby | |
| 6,070,078 A | 5/2000 | Camp, Jr. et al. | |
| 6,078,820 A | 6/2000 | Wells et al. | |
| 6,085,099 A | 7/2000 | Ritter et al. | |
| 6,112,078 A | 8/2000 | Sormunen et al. | |
| 6,133,874 A | 10/2000 | Krasner | |
| 6,138,003 A | 10/2000 | Kingdon et al. | |
| 6,150,980 A | 11/2000 | Krasner | |
| 6,259,923 B1 | 7/2001 | Lim et al. | |
| 6,266,533 B1 | 7/2001 | Zadeh et al. | |
| 6,429,808 B1 | 8/2002 | King et al. | |
| 6,456,843 B1 | 9/2002 | Daly | |
| 6,535,815 B2 | 3/2003 | Bloebaum | |
| 6,625,458 B2 | 9/2003 | Pihl et al. | |
| 6,658,258 B1 | 12/2003 | Chen et al. | |
| 6,754,482 B1 | 6/2004 | Torabi | |
| 6,937,865 B1 | 8/2005 | Bloebaum et al. | |
| 6,957,073 B2 | 10/2005 | Bye | |
| 6,987,964 B2 | 1/2006 | Obradovich et al. | |
| 6,993,429 B2 | 1/2006 | Obradovich et al. | |
| 7,043,363 B2 | 5/2006 | Yamamoto et al. | |
| 7,076,256 B1 | 7/2006 | Orler et al. | |
| 7,177,651 B1 * | 2/2007 | Almassy | G01S 5/0072 340/994 |
| 7,228,140 B2 | 6/2007 | Anctil et al. | |
| 7,359,716 B2 | 4/2008 | Rowitch et al. | |
| 7,505,757 B2 | 3/2009 | Rowitch et al. | |
| 8,938,253 B2 | 1/2015 | Rowitch et al. | |
| 2001/0018663 A1 | 8/2001 | Dussell et al. | |
| 2001/0029184 A1 | 10/2001 | Ianson et al. | |
| 2002/0029108 A1 | 3/2002 | Liu et al. | |
| 2002/0077126 A1 | 6/2002 | Pihl et al. | |
| 2002/0082774 A1 | 6/2002 | Bloebaum | |
| 2002/0094822 A1 | 7/2002 | Anctil et al. | |
| 2002/0101374 A1 | 8/2002 | Mutoh et al. | |
| 2002/0102988 A1 | 8/2002 | Myllymaki | |
| 2002/0115453 A1 | 8/2002 | Poulin et al. | |
| 2002/0154058 A1 | 10/2002 | Pande et al. | |
| 2002/0156646 A1 | 10/2002 | Kaiwa et al. | |
| 2002/0160766 A1 | 10/2002 | Portman et al. | |
| 2002/0164998 A1 * | 11/2002 | Younis | G01S 19/06 455/456.1 |
| 2002/0177449 A1 | 11/2002 | McDonnell et al. | |
| 2002/0177949 A1 | 11/2002 | Katayama et al. | |
| 2002/0196189 A1 | 12/2002 | Choi | |
| 2003/0069694 A1 | 4/2003 | Fuchs et al. | |
| 2003/0070091 A1 | 4/2003 | Loveland | |
| 2003/0087629 A1 | 5/2003 | Juitt et al. | |
| 2003/0119528 A1 | 6/2003 | Pew et al. | |
| 2003/0139175 A1 | 7/2003 | Kim | |
| 2004/0064707 A1 | 4/2004 | McCann et al. | |
| 2004/0073365 A1 | 4/2004 | Alanen et al. | |
| 2004/0139204 A1 | 7/2004 | Ergezinger et al. | |
| 2004/0148090 A1 | 7/2004 | Melen | |
| 2004/0203903 A1 | 10/2004 | Wilson et al. | |
| 2004/0235454 A1 | 11/2004 | Rowitch et al. | |
| 2004/0242209 A1 | 12/2004 | Kruis et al. | |
| 2005/0128102 A1 | 6/2005 | Obradovich et al. | |
| 2006/0036365 A1 * | 2/2006 | Chiayee | G01S 19/37 701/469 |
| 2009/0176506 A1 | 7/2009 | Rowitch et al. | |
| 2014/0349680 A1 | 11/2014 | Rowitch et al. | |

FOREIGN PATENT DOCUMENTS

| | | |
|---|---|---|
| WO | 9927746 A1 | 6/1999 |
| WO | 02054814 A1 | 7/2002 |
| WO | 02058414 A1 | 7/2002 |
| WO | 04071126 | 8/2004 |
| WO | 04071127 | 8/2004 |

OTHER PUBLICATIONS

International Preliminary Examination Report PCT/US2004/002936 International Search Authority US dated Dec. 14, 2006.
International Preliminary Examination Report PCT/US2004/002938 International Search Authority US dated Mar. 7, 2007.
International Search Report PCT/US2004/002936 International Search Authority dated Oct. 4, 2004.
International Search Report PCT/US2004/002938 International Search Authority European Patent Office, dated Oct. 4, 2004.
Written Opinion PCT/US2004/002936 International Seach Authority European Patent Office dated Jul. 31, 2005.
Written Opinion PCT/US2004/002938 International Seach Authority European Patent Office dated Jul. 31, 2005.

* cited by examiner

LOCATION BASED SERVICE (LBS) SYSTEM, METHOD AND APPARATUS FOR TRIGGERING OF MOBILE STATION LBS APPLICATIONS

The present Application for Patent is a Continuation of U.S. patent application Ser. No. 14/453,517 "LOCATION BASED SERVICE (LBS) SYSTEM, METHOD AND APPARATUS FOR TRIGGERING OF MOBILE STATION LBS APPLICATIONS" filed on Aug. 6, 2014; which claims the benefit of Continuation U.S. patent application Ser. No. 12/404,151 entitled "LOCATION BASED SERVICE (LBS) SYSTEM, METHOD AND APPARATUS FOR TRIGGERING OF MOBILE STATION LBS APPLICATIONS" filed on Mar. 13, 2009, now U.S. Pat. No. 8,938,253; which claims the benefit of U.S. patent application Ser. No. 10/770,878 entitled "LOCATION BASED SERVICE (LBS) SYSTEM, METHOD AND APPARATUS FOR TRIGGERING OF MOBILE STATION LBS APPLICATIONS" filed on Feb. 2, 2004, now U.S. Pat. No. 7,505,757; which claims the benefit of U.S. Provisional Application Ser. No. 60/445,815 entitled "GLOBAL POSITIONING SYSTEM (GPS) USER PLANE MOBILE STATION MOBILE POSITIONING CENTER (MS-MPC)", filed Feb. 5, 2003 as well as the benefit of U.S. Provisional Application Ser. No. 60/444,248 entitled "GLOBAL POSITIONING SYSTEM (GPS) USER PLANE MOBILE STATION MOBILE POSITIONING CENTER (MS-MPC)", filed on Jan. 31, 2003, the contents of all of which are incorporated herein by reference in their entirety for all purposes.

BACKGROUND

Field

The present invention relates generally to communication, and more specifically to a system, method and apparatus for performing location determination by triggering a location based application to run within a mobile station of a communication system.

Background

Often, it is desirable to know the location of a wireless user. In fact, it is sometimes necessary. For example, the Federal Communications Commission (FCC) has adopted a report and order for an enhanced 911 (E-9-1-1) wireless service that requires the location of a mobile station (e.g., a cellular phone) to be provided to a Public Safety Answering Point (PSAP) each time a 911 call is made from the mobile station. In addition to the FCC mandate, a network operator/service provider may support various applications that use location based services. Such services provide the location of mobile stations. The term "applications" refers to the particular uses that are made of location information. Often times, applications are implemented with computer software that is either executed by a processor within a mobile station or by a processor located within a component of a wireless infrastructure network that is in communication with the mobile station. Applications that use this information may include, for example, location-sensitive billing, asset tracking, asset monitoring and recovery, fleet and resource management, personal-location services, and so on. Some specific examples of applications for personal-location services include (1) providing a local map to a mobile station based on its location, (2) providing a recommendation for a facility (e.g., a hotel or a restaurant) based on the mobile station's location, and (3) providing directions to the recommended facility from the mobile station's current location.

Currently, in at least some situations, use of location based services (i.e., either a mobile station that desires to know its location, or an entity that desires the location of a mobile station) requires payment to the service provider. In order to ensure that such payment can be collected, as well as to ensure privacy and for other reasons, it is critical to "authorize" the application. Authorization of an application refers to the act of verifying that there is "sufficient" identity and billing information. Such identity and billing information includes such things as: 1) billing address, and 2) authorization from the service provider to access the requested location information, and 3) agreement between the party to be billed and the billing entity (i.e., the service provider) regarding the terms and conditions under which requested location information will be provided. That identity and billing information is considered to be "sufficient" if it: 1) allows the service provider to bill and collect fees from the party using the location based services (e.g., providing the position location information) and 2) protects the privacy of anyone about whom location information will be made available.

It is typically the case that applications accessed by a mobile station are run within a component that is within the network. In such cases, the application will typically need to trigger the mobile station to respond to external requests for information or to begin running an application within the mobile station for the purpose of allowing the position of the mobile station to be determined. However, in light of the above stated concerns for both privacy and to ensure that billing is not neglected, there is a need for some security to be put in place that would ensure that the mobile station is not triggered by an external device that is not authorized to do so. The presently disclosed method and apparatus is provided such assurance.

SUMMARY

The presently disclosed method and apparatus allows an application executed within a mobile station to be triggered only by a mobile positioning center (MPC). The mobile station communicates with a component of the communication infrastructure, which in accordance with one embodiment of the disclosed method and apparatus is a component within a cellular communication network infrastructure. A typical cellular communication network infrastructure includes a base station through which signals are transmitted over the air between a wireless mobile station and the network. An MPC is coupled to the base station using any one of a variety of potential configurations that are well known in the art. In accordance with the presently disclosed method and apparatus, the MPC is responsible for authorizing an application that is either resident within the mobile station or that is run in a device that is resident elsewhere in the network. The mobile station communicates with the MPC over a communication session through the base station and other infrastructure components. The mobile station initiates a mobile originated positioning session over a second communication session with a positioning assistance server, for example, a mobile originated IS-801 session.

Various aspects and embodiments of the invention are described in further detail below.

BRIEF DESCRIPTION OF THE DRAWINGS

The disclosed method and apparatus will become more apparent from the detailed description set forth below when

DETAILED DESCRIPTION

Figure 1:
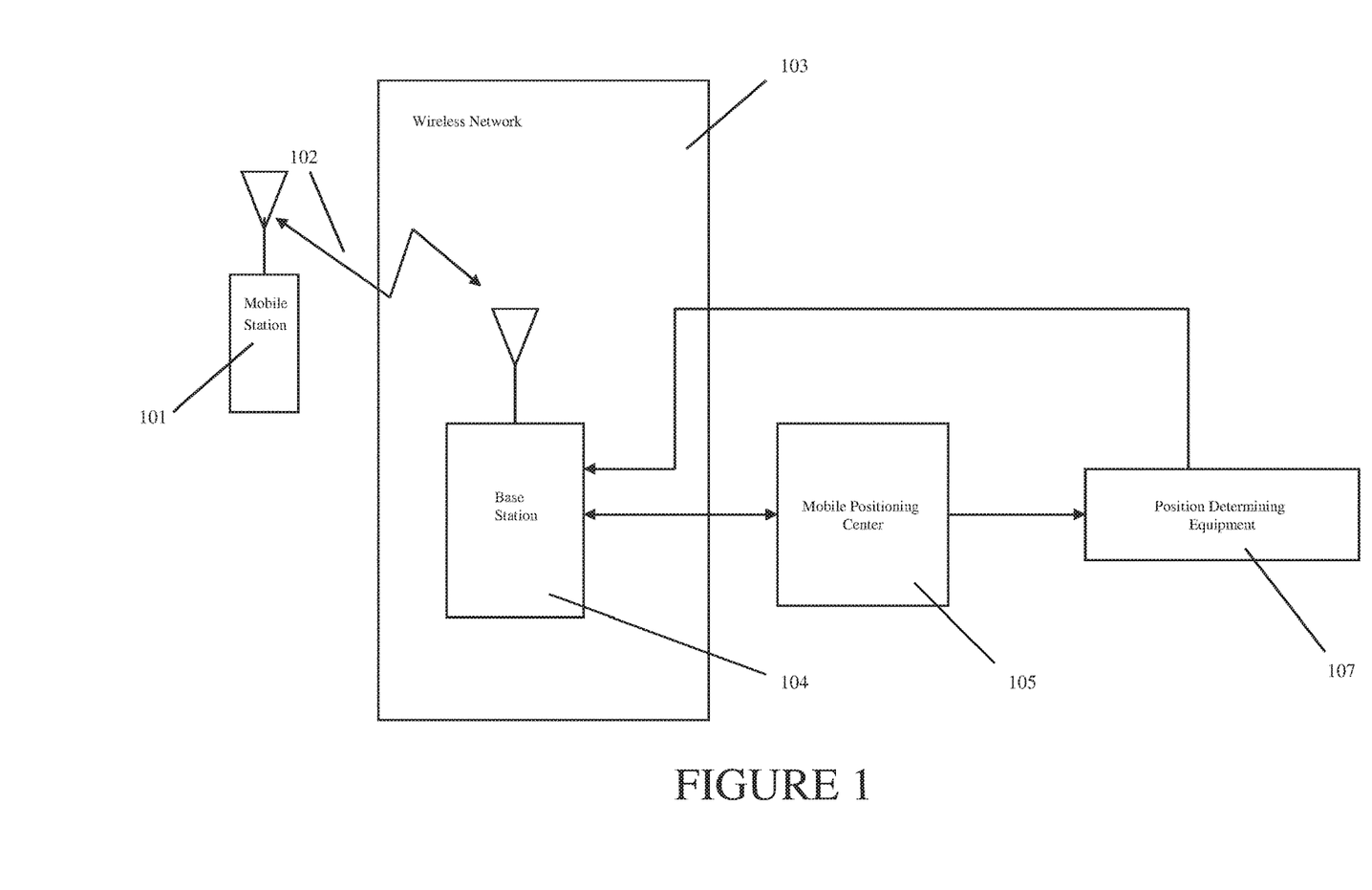
FIG. 1 is a simplified block diagram illustrating a system including a mobile station, wireless communication network, mobile positioning center (MPC), and position determining equipment (PDE) in accordance with the disclosed method and apparatus.

FIG. 1 is a simplified block diagram illustrating a system 100 including a mobile station 101, wireless communication network 103, mobile positioning center (MPC) 105, and position determining equipment (PDE) 105 in accordance with the disclosed method and apparatus. The mobile station 101 may be any wireless device capable of supporting location based services (LBSs) in conjunction with an LBS application that may be run either within the mobile station 101 or external to the mobile station 101. For the purpose of this document, LBS applications include any program, applet, routine, or other such computer implemented algorithm that uses the location of either the mobile station in which the application is running or the location of another mobile station to provide information or service to a user. Examples of such LBS applications include programs that can: 1) identify the location of a mobile station being operated by another person to allow the LBS client (i.e., the person requesting the LBS service) to locate another person using a properly equipped mobile station; 2) locate a nearby product or service outlet and provide the user with directions to the outlet, such as an automatic teller machine or restaurant; 3) track a properly equipped mobile station, etc. Examples of wireless devices include cellular telephones, wireless modems, personal information managers (PIMs), personal digital assistants (PDAs), etc.

As shown in FIG. 1, the mobile station 101 communicates over a wireless link 102 with the wireless network 103. The wireless network 103 includes at least a base station 104 capable of receiving information from, and transmitting information to, the mobile station 101 over the wireless link 102. For the purposes of this disclosure, the base station 104 includes various other components of the wireless network 103 which are not shown for the sake of simplicity, such as base station controllers (BSCs), mobile switching centers (MSCs), etc.

The base station 104 is coupled to the MPC 105 by any conventional communication medium, including, but not limited to cables, microwave links, satellite communication links, etc. Similarly, the MPC 105 is coupled to the PDE 107 by any conventional communication medium.

Figure 2:
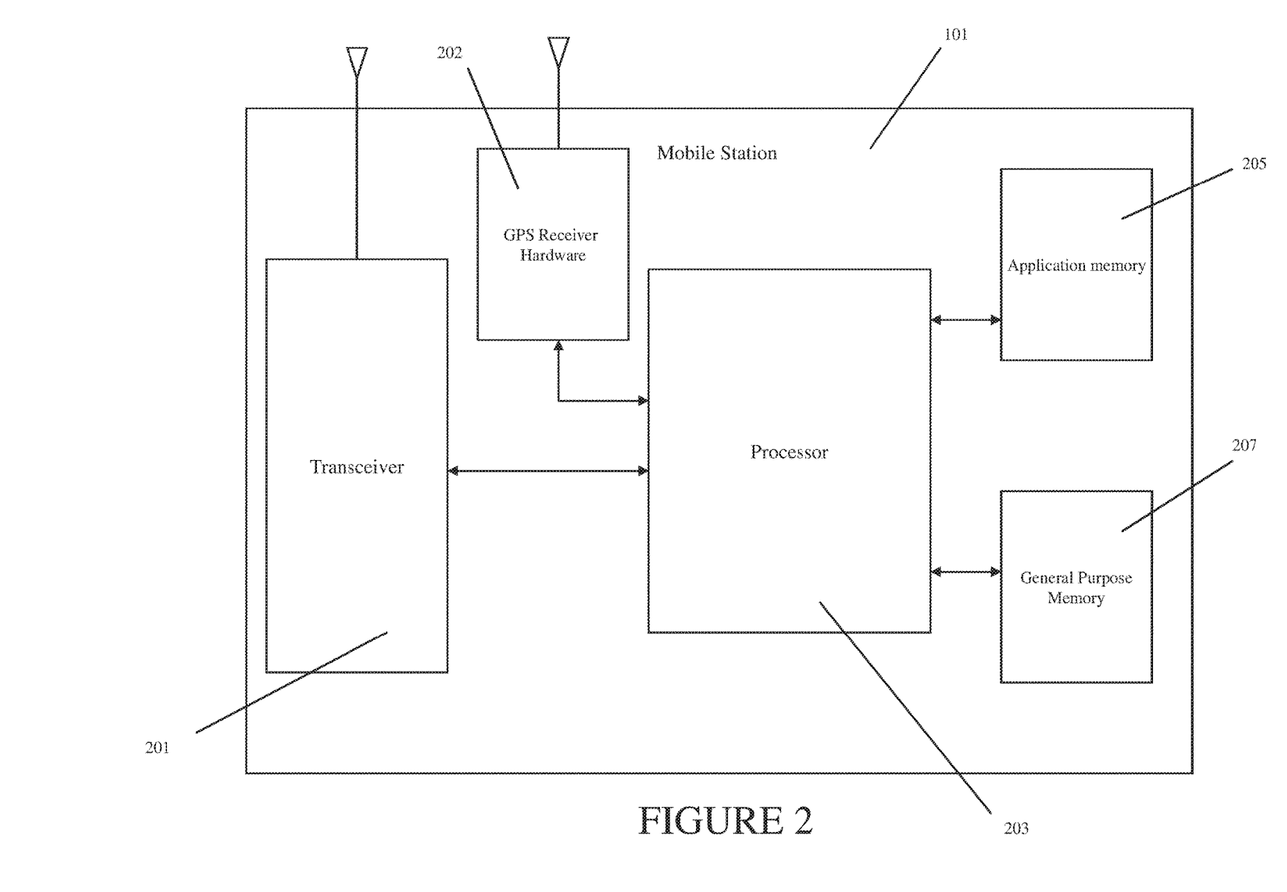
FIG. 2 is a simplified block diagram of the components of a mobile station 101 in accordance with the disclosed method and apparatus.

FIG. 2 is a simplified block diagram of the components of a mobile station 101 in accordance with the disclosed method and apparatus. The mobile station 101 shown in FIG. 2 includes a transceiver 201, processor 203, application memory 205 and general purpose memory 207. The processor 203 is shown as one block. However, it should be understood by those skilled in the art that the functions disclosed as being performed by the processor 203 may be performed by a collection of discrete processors either acting in concert or operating independently. Accordingly, such a collection of processors may be either coupled together in order to perform the disclosed functions or they may operate completely independent of one another. Furthermore, in accordance with alternative embodiments of the disclosed method and apparatus, the application memory 205 and general purpose memory 207 may be combined into a single memory device that stores the information disclosed herein as being stored in these two memories 205, 207. In yet another alternative embodiment, the mobile station 101 might comprise several additional independent memory devices that share responsibility for storing information within the mobile station 101.

In accordance with one embodiment of the presently disclosed method and apparatus, the processor 203 has several functions that operate in concert as a protocol stack. However, it should be understood that this particular configuration is not essential to the disclosed method and apparatus.

Figure 3:
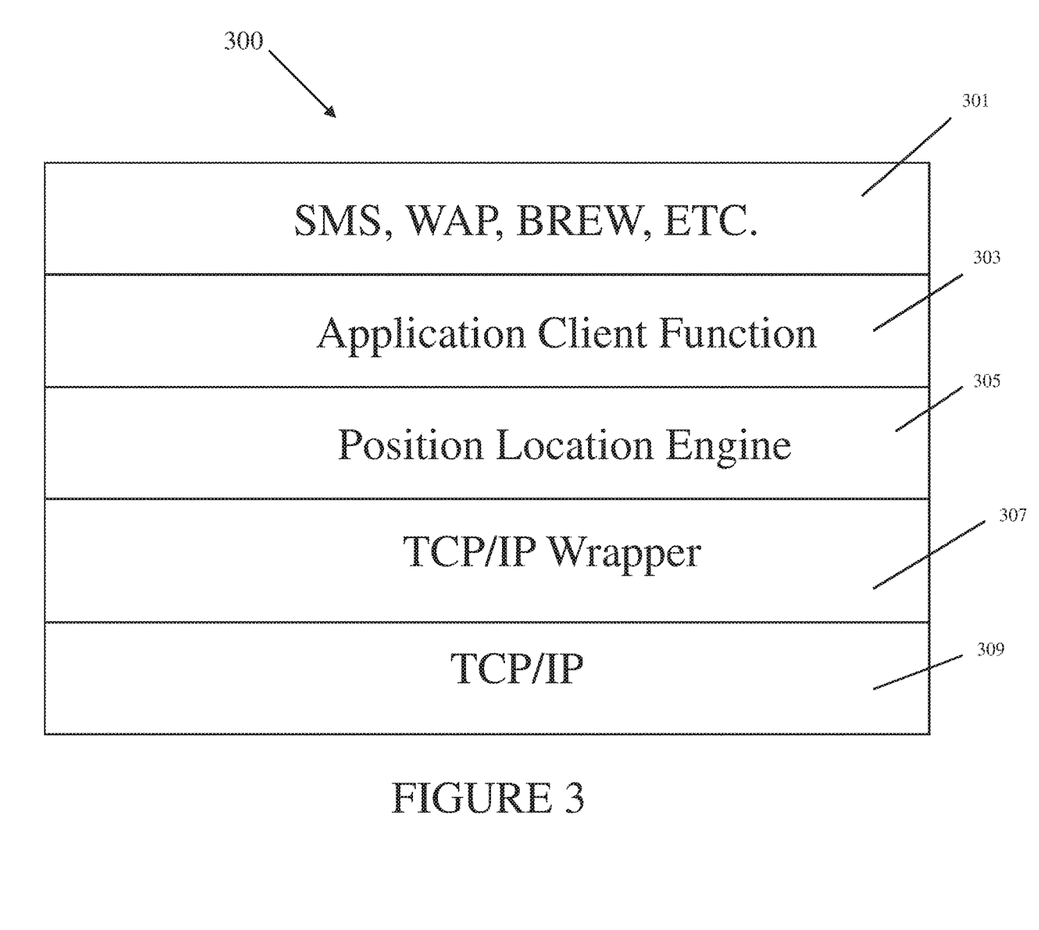
FIG. 3 is a schematic diagram of an example of a protocol stack 300 used within one embodiment of the disclosed method and apparatus.

FIG. 3 is a schematic diagram of an example of a protocol stack 300 used within one embodiment of the disclosed method and apparatus. For the purpose of this disclosure, a protocol stack is any set of routines or program instructions that operate together, typically with one routine building on and using the functions of another lower level routine or program. A first function within the protocol stack 300 of FIG. 3 is the operating system 301. The operating system 301 is a foundational function upon which other functions build. That is, the operating system 301 includes functions that can be accessed and used by the other functions performed within the processor 203. In accordance with one embodiment of the presently disclosed method and apparatus, the operating system 301 is a Binary Run-time Environment for Wireless (BREW) operating system. Alternatively, the operating system 301 is a Wireless Application Protocol (WAP). In yet another alternative embodiment, the operating system is a Short Message Service (SMS) operating system. In yet another alternative, the operating system is a Java operating system, etc. Java is a trademark for the operating system of Sun Microsystems. Those skilled in the art will appreciate that the particular operating system used is not directly relevant to the presently disclosed method and apparatus for authorizing an LBS application 303 to run within the mobile station 101.

In accordance with one embodiment, an application client function 303 runs on top of the operating system 301. In one example, the application client function 303 is an LBS application that may access and utilize user interface functions to receive information from the mobile station user through a conventional data input device, such as a keyboard or touch screen. Such an LBS application may also access and utilize the operating system functions to provide information back to the mobile station user through a liquid crystal diode (LCD) display screen. In another example, the application client function 303 is a routine that interfaces between the operating system 301 and higher layers of the protocol stack 300 to initiate a position location determination operation.

One function of the application client function is to assist in locating the mobile station 101. In addition, if the application client function is an LBS application, the application may determine what points of interest and service outlets are in the vicinity of the mobile station (e.g., shops, automatic teller machines, restaurants, museums, etc.) and provide navigational directions and maps to the user based on a knowledge of the location of the mobile station and the location of particular service outlets and points of interest.

The application client function 303 assists in locating the mobile station 101 by accessing a position location engine 305. The position location engine 305 may be any function capable of either determining the location of the mobile station 101 itself, or capable of providing information, such as pseudo-ranges to GPS satellites, that are useful in aiding another device in determining the location of the mobile station 101. In one embodiment of the disclosed method and apparatus, the position location engine 305 is a component of a global positioning satellite (GPS) system. The position location engine 305 in this example includes a GPS receiver function that allows the mobile station 101 (together with the GPS receiver hardware 202) to receive information from GPS satellites for the purpose of determining the location of the mobile station 101.

In addition, in one embodiment of the disclosed method and apparatus, the position location engine 305 requests and receives aiding information from the PDE 107. For example, in one embodiment, the mobile station 101 requests information as to which satellites are "in view". If a satellite is in view, then the mobile station 101 should be able to receive and demodulate information from that satellite.

In addition, the mobile station 101 might request information regarding the locations of the "in view" satellites, information about correction factors to be used when calculating the location of the mobile station 101 using information received from the in view satellites, information regarding the amount of Doppler shift that the mobile station 101 might expect to encounter when receiving signals from the in view satellites, and other such useful information. This information enables the mobile station 101 to more rapidly detect and "acquire" satellites. Acquisition of a satellite refers to the process by which the mobile station 101 receives signals transmitted from the satellite and aligns the received information with local timing within the mobile station 101 in preparation for the mobile station 101 to interpret information modulated on the signals transmitted by the satellite. A further discussion is provided below regarding the process of receiving aiding information from the PDE 107.

FIG. 3 also shows an SMS messaging protocol layer 307. The SMS messaging protocol layer 307 provides support for sending and receiving messages in accordance with the well-known SMS communication protocol outlined in IS-637A and IS-41, both published by the TIA/EIA. Accordingly, information that is to either received or transmitted by the mobile station 101 is provided to the SMS messaging protocol layer 307. The SMS messaging protocol layer 307 then formats the information appropriately in accordance with the SMS protocol specification so that other devices to which the information is to be transmitted can receive and interpret the information sent by the mobile station 101.

In addition, the SMS messaging protocol layer will route messages to the appropriate lower level protocol layer based upon data in the received message. In particular, SMS messages have a field commonly known as the SMS teleservice identifier. Depending upon the value carrier within the SMS teleservice identifier field, the SMS message will be routed to different components for interpretation. In accordance with the presently disclosed method and apparatus, a particular value in the SMS teleservice identifier field is associated with messages that are intended to be interpreted by the position location engine 305. All other messages are sent to another protocol layer to be interpreted and acted (or not acted) upon. A significant feature of the SMS teleservice identifier field is that, as opposed to the payload fields within an SMS message, the SMS teleservice identifier field can only be altered (i.e., information can only be put into the field) by selected components within the communications system. The most significant of these components is the MPC 105. Accordingly, if only network components are capable of altering the value of the SMS teleservice identifier field, and the mobile station 101 will only route messages to the position location engine 305 if the value of the SMS teleservice identifier field is a particular predetermined value, then a secure system can be established for allowing access to the position location engine 305 within the mobile station 101.

Figure 4:
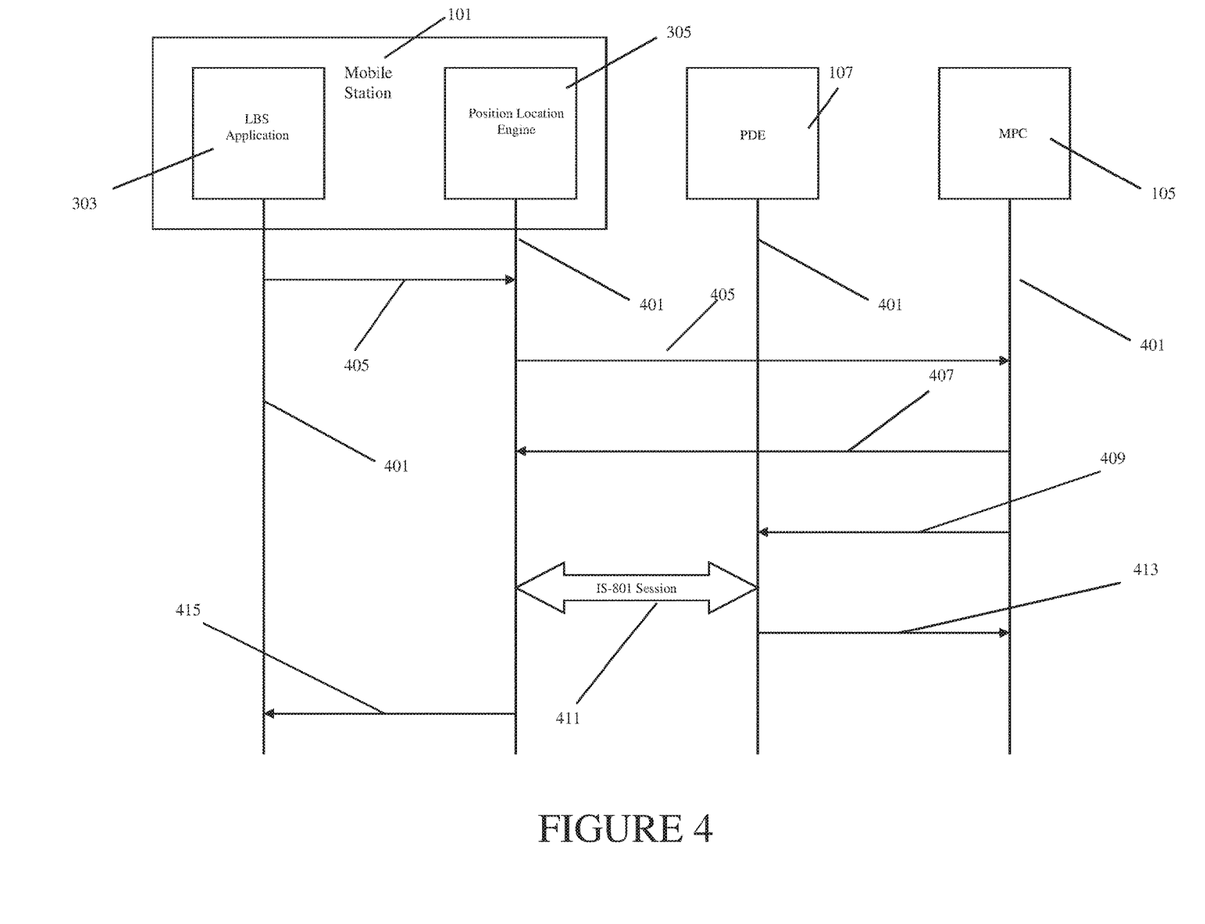
FIG. 4 is a schematic diagram showing the sequence of messages passed between various components of a system implementing the disclosed method and apparatus.

FIG. 4 is a schematic diagram showing the sequence of messages passed between various components of a system 100 implementing the disclosed method and apparatus. Blocks shown across the top of FIG. 4 represent each of these components. These components include the SMS messaging protocol layer 307, application client function 303, the position location engine 305, the PDE 107, the MPC 105, a Mobile Center (MC) 402 and an LBS client 403. A line 401 vertically descending from each component 303, 305, 107, 105, 402, 403 represents a passage of time. The points of the line closest to the components 303, 305, 107, 105, 402, 403 represent the most recent points in time.

Initially, the LBS client 403 (such as another mobile station) requests the position of the mobile 101 from the MPC 105 as indicated by the arrow 405. The MPC 105 is responsible for determining whether the request is authorized. Upon determining that the request is authorized, the MPC 105 provides a "GPOSREQ" message 407 to the PDE 107 in addition to providing a mobile terminated (MT) SMS message 409 to the mobile station 101. The GPOSREQ message 407 to the PDE 107 seeds the PDE 107 with information that assists the PDE 107 to work together with the position location engine 305 in determining the location of the mobile station 101. In particular, the GPOSREQ message 407 provides the PDE 107 with information regarding the location of the base station 104 with which the mobile station 101 is in communication. This information allows the PDE 107 to determine the location of the mobile station 101 to within a couple of miles or less. The PDE 107 can then most effectively provide aiding information to assist the position location engine 305 within the mobile station 101 to more easily determine which satellites are in view and to acquire those satellites far more rapidly.

The MT SMS message 409 sent from the MPC to the MC 402. The MC 402 then determines that the message is intended to trigger the mobile station 101 to perform a position location operation. Accordingly, the MC 402 formats a message 411 to the SMS messaging protocol layer 307 within the mobile station 101. The message 411 from the MC 402 to the SMS messaging protocol layer 307 includes a predetermined value in the teleservices identification field. In one embodiment of the disclosed method and apparatus, a value of 65001 is selected as the predetermined value that indicates that the SMS messaging protocol layer 307 should interpret the incoming MT SMS message as a message intended for the application client function 303 and ultimately for the position location engine 305. Upon receiving the message 411 containing the predetermined value in the teleservices identification field, the SMS messaging protocol layer 307 passes the information contained in the payload of the SMS message 411 to the application client function 303 in a message 413 from the SMS messaging protocol layer 307 to the application client function 303.

The application client function 303 then sends a message 415 to the position location engine 305. The application client function 303 formulates the message 415 to the position location engine 305 to command the position location engine 305 to begin sending and receiving position location related information to and from the PDE 107 in accordance with IS-801, as published by the TIA/EIA. The result of this "IS-801 session" 417 is the determination of the position of the mobile station 101. The PDE, then transmits the position of the mobile station 101 to the MPC 105 in a message 419. The MPC 105 in turn transmits the position of the mobile station 101 to the LBS client 403.

Since the MC 402 is uniquely enabled within the network to alter the bits in the teleservices identification field of the SMS message, there is no possibility for an unauthorized entity, such as a rouge mobile station, to provide an unauthorized trigger to the mobile station 101 to allow the location of the mobile station 101 to be determined without proper authorization.

Figure 5:
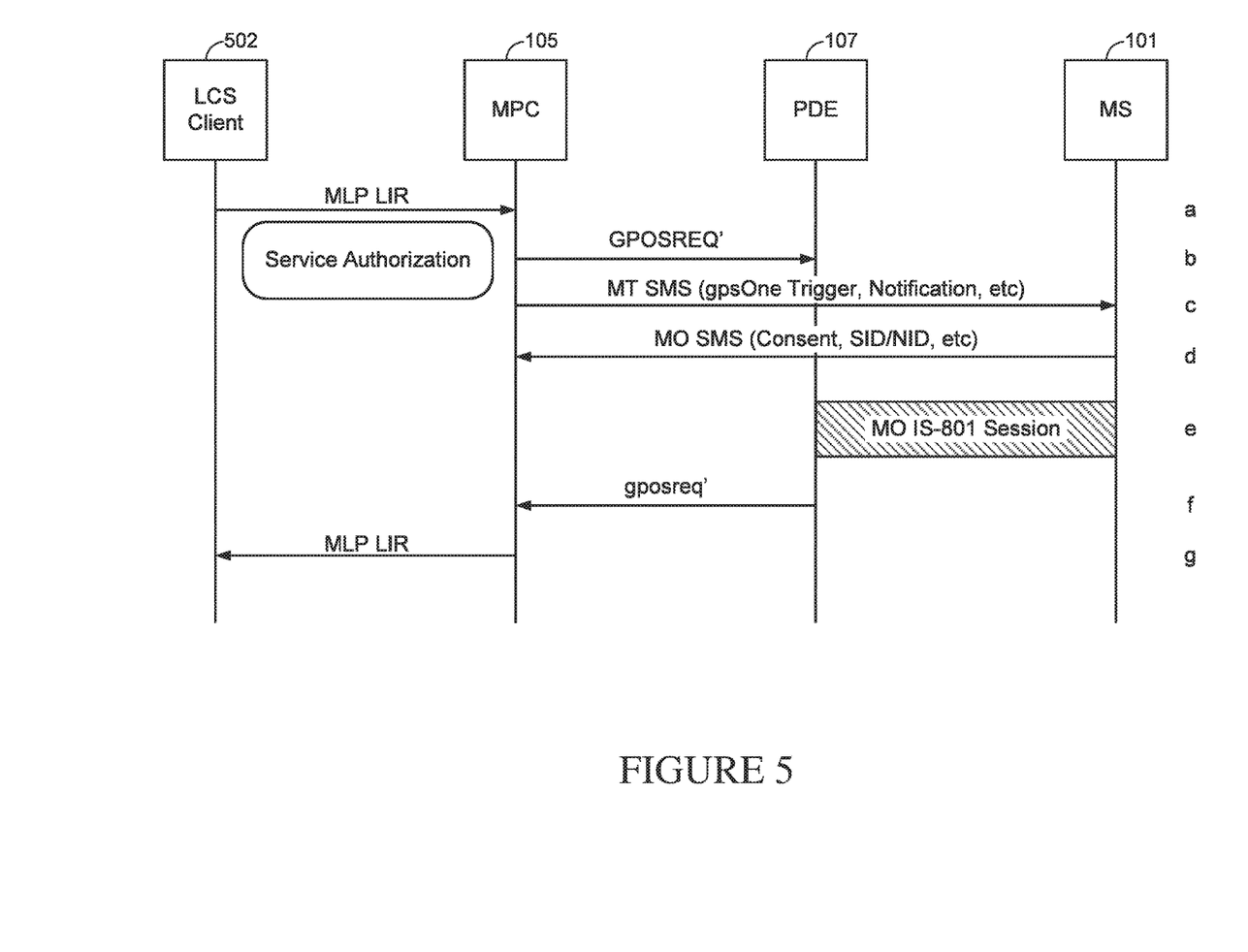
FIG. 5 is a schematic diagram of a call flow for a network-initiated, successful positioning exchange.

FIG. 5 shows a network-initiated positioning application where positioning (e.g., GPS positioning) is used successfully. The call flow shown in FIG. 5 applies whether user consent is needed or not. The letters for the following paragraphs correspond to FIG. 5.

a) An LCS client, e.g., the LBS client 403, requests the position of a mobile 101 from the MPC 105 via the LIF MLP (location interoperability forum mobile location protocol) protocol.

b) If the request is authorized, the MPC 105 sends a GPOSREQ' message to the PDE 107, seeding the PDE 107 such that it will accept the soon to-be coming MO (mobile originated) IS-801 session from the mobile 101.

c) Simultaneously, the MPC 105 sends an MT (mobile terminated) SMS message to the mobile indicating that a GPS session is needed along with other things such as notification and verification procedures, and so on. The details of this message are described below.

d) The mobile 101 sends up to the MPC 105 the consent or lack of consent of the user, along with other parameters such as SID, NID, and so on. The details of this message are described below.

e) The mobile 101 and PDE 107 perform an MO IS-801 session.

f) The PDE 107 provides the position estimate to the MPC 105 in a gposreq' message.

g) The MPC 105 provides the position estimate to the LCS client.

The call flow shown in FIG. 5 operates according to an SMS-based MS (mobile station)-MPC protocol. The SMS-based MS-MPC protocol is used in scenarios where an external entity in the application space interacts with the MPC 105 to obtain the position of a mobile 101. The protocol is a request/response protocol initiated by the MPC 105.

An SMS client shall allow the network to send an SMS message to the mobile station 101 in order to start the positioning process. The mobile station 101 forwards SMS messages to the application client function 303 based on an SMS message containing one of the following methods:

Dedicated SMS Teleservice Identifier=65001
Dedicated Originating Subaddress

The mobile station 101 replies to request messages using a corresponding addressing method (that is, if the above teleservice identifier is present on the request, the response uses the same teleservice identifier; alternatively, if the originating subaddress field method is used, the reply is made using the same originating subaddress). These modes of addressing are mutually exclusive. The addressing mode could be changed from one transaction to another, but is maintained within a transaction.

Two messages are defined for the MS-MPC protocol: A Positioning Request message and a Positioning Response message. The Positioning Request message contains the following parameters:

Notification and Verification Indicator (8 bits)—Informs the MS 101 whether or not end user notification and verification are needed.

Positioning Technology Indicator (8 bits)—Informs the MS 101 whether an IS-801 session is needed, whether to send information to allow for cell/sector positioning, or whether a cached position will be used.

Correlation Identifier (8 bits)—An identifier assigned to the MT SMS such that the MO SMS-based consent indication can be correlated to a request. This value is echoed in the MO SMS response.

PDE IP Address (32 bits)—Used by the MS 101 to initiate the IS-801 session.

PDE Port Number (16 bits)—The TCP (transmission control protocol) port number to be used by the MS 101 to initiate the IS-801 session.

Requester's Identifier (variable)—An ASCII string representing the name assigned to the requesting entity for presentation to the user.

If notification and verification are needed, a pop-up screen will be presented to the user, and the user will be requested to respond in the positive or the negative. The MS 101 sends an MO SMS message addressed to the address of the entity that sent the MT SMS message. The MO SMS message will vary depending upon whether the user accepts the positioning request, the user rejects the positioning request, or the MO SMS is to contain cell/sector related information (if consent is given or not needed).

The Positioning Response message contains the following parameters:

Version (8 bits)—Indicates the version of the protocol.

Consent Indicator (8 bits)—Indicates whether user consent to the Positioning Request is given, user consent is not given (due to the user denying the request or the pop-up screen described above timing out), the MS 101 refused the Positioning Request (due to Busy, Privacy, Protocol Error, and/or other states), or consent is not needed/requested.

GPS Status (8 bits)—Indicates, if applicable, whether the MS 101 can comply with a request for an IS-801 session given in the MT SMS message.

Correlation Identifier (8 bits)—Echoed value of the Correlation Identifier received in the MT SMS message.

SID (16 bits), NID (16 bits), BASE_ID (16 bits), BASE_LAT (24 bits), BASE_LONG (24 bits), Time Stamp (40 bits)—System Identifier, Network Identifier, base station identifier, latitude and longitude, and an associated time stamp, respectively. Provided in the Positioning Response if consent is given or not needed.

The description of the methods and apparatuses is provided to enable any person skilled in the art to make or use the invention defined by the claims appended hereto. Various modifications to these methods and apparatuses will be readily apparent to those skilled in the art. However, the generic principles defined herein may be applied to other embodiments of the methods and apparatuses without departing from the spirit or scope of the claimed invention. Thus, the claimed invention is not intended to be limited to the embodiments of the methods and apparatuses shown herein, but rather is to be accorded the widest scope consistent with the principles and novel features disclosed herein.

What is claimed is:

1. A method for triggering an application in a mobile station, the method comprising:
   receiving, at the mobile station, a mobile terminated authorization request from a network authorizing element using a first positioning protocol, the mobile terminated authorization request comprising a request to initiate a location determination session with a positioning assistance server, wherein the mobile terminated authorization request is in response to a position request received by the network authorizing element for a position of the mobile station from a client;
   in response to receiving the mobile terminated authorization request, determining, by the mobile station, using a value in a teleservices identification field of the mobile terminated authorization request, that the mobile terminated authorization request is intended for the application in the mobile station and that the network authorizing element is an authorized entity;
   in response to determining that the mobile terminated authorization request is intended for the application in the mobile station, providing information contained in a payload of the mobile terminated authorization request to the application in the mobile station; and
   in response to receiving the information contained in the payload of the mobile terminated authorization request, initiating, by the application in the mobile station, the location determination session, using a second positioning protocol, with the positioning assistance server to determine the position of the mobile station.

2. The method of claim 1, further comprising:
   sending, by the mobile station, a mobile originated communication acknowledging the mobile terminated authorization request to the network authorizing element comprising an indication of consent or non-consent of a user of the mobile station to the position request from the client for the position of the mobile station.

3. The method of claim 2, wherein one or both of the mobile terminated authorization request from the network authorizing element and the mobile originated communication comprises a Short Message Service (SMS) message.

4. The method of claim 1, wherein the network authorizing element comprises a mobile positioning center (MPC).

5. The method of claim 1, wherein the positioning assistance server comprises position determining equipment (PDE).

6. The method of claim 1, wherein the receiving the mobile terminated authorization request from the network authorizing element using the first positioning protocol comprises receiving a message according to an MS-MPC protocol and/or wherein the initiating the location determination session using the second positioning protocol comprises initiating a mobile originated IS-801 session.

7. The method of claim 1, wherein the network authorizing element authorizes the location determination session using one or more of an authorization, security information for authentication and privacy, billing information, and agreement between a party to be billed and a billing entity.

8. A mobile station capable of receiving and responding to a position request requesting a position of the mobile station, the mobile station comprising:
   a transceiver coupled to an antenna;
   a memory; and
   a processor coupled to the transceiver and the memory, the processor configured to:
      receive and process a mobile terminated authorization request from a network authorizing element using a first positioning protocol, the mobile terminated authorization request comprising a request to initiate a location determination session with a positioning assistance server, wherein the mobile terminated authorization request is in response to the position request for the position of the mobile station by a client;
      in response to receiving the mobile terminated authorization request, determine, using a value in a teleservices identification field of the mobile terminated authorization request that the mobile terminated authorization request is intended for an application in the mobile station and that the network authorizing element is an authorized entity;
      in response to determining that the mobile terminated authorization request is intended for the application in the mobile station, provide information contained in a payload of the mobile terminated authorization request to the application in the mobile station; and
      initiate the location determination session using a second positioning protocol with the positioning assistance server to determine the position of the mobile station.

9. The mobile station of claim 8, the processor further configured to send a mobile originated communication acknowledging the mobile terminated authorization request to the network authorizing element comprising an indication of consent or non-consent of a user of the mobile station to the position request by the client for the position of the mobile station.

10. The mobile station of claim 9, wherein one or both of the mobile terminated authorization request from the network authorizing element and the mobile originated communication comprises a Short Message Service (SMS) message.

11. The mobile station of claim 8, wherein the network authorizing element comprises a mobile positioning center (MPC) and/or the positioning assistance server comprises position determining equipment (PDE).

12. The mobile station of claim 8, wherein the processor configured to receive the mobile terminated authorization request from the network authorizing element using the first positioning protocol comprises the processor configured to receive a message according to an MS-MPC protocol and/or wherein the processor configured to initiate the location determination session using the second positioning protocol comprises the processor configured to initiate a mobile originated IS-801 session.

13. The mobile station of claim 8, wherein the network authorizing element authorizes the location determination session using one or more of an authorization, security information for authentication and privacy, billing information, and agreement between a party to be billed and a billing entity.

14. A mobile station capable of receiving and responding to a position request requesting a position of the mobile station, the mobile station comprising:
   means for receiving, at the mobile station, a mobile terminated authorization request from a network authorizing element using a first positioning protocol, the mobile terminated authorization request comprising a request to initiate a location determination session with a positioning assistance server, wherein the mobile terminated authorization request is in response to a position request received by the network authorizing element for a position of the mobile station by a client;

means for, in response to receiving the mobile terminated authorization request, determining, using a value in a teleservices identification field of the mobile terminated authorization request, that the mobile terminated authorization request is intended for an application in the mobile station and that the network authorizing element is an authorized entity;

means for, in response to determining that the mobile terminated authorization request is intended for the application in the mobile station, providing information contained in a payload of the mobile terminated authorization request to the application in the mobile station; and means for, in response to receiving the information contained in the payload of the mobile terminated authorization request, initiating, by the application in the mobile station, the location determination session using a second positioning protocol with the positioning assistance server to determine the position of the mobile station.

15. The mobile station of claim 14, further comprising means for sending, by the mobile station, a mobile originated communication acknowledging the mobile terminated authorization request to the network authorizing element comprising an indication of consent or non-consent of a user of the mobile station to the position request by the client for the position of the mobile station.

16. The mobile station of claim 15, wherein one or both of the mobile terminated authorization request from the network authorizing element and the mobile originated communication comprises a Short Message Service (SMS) message.

17. The mobile station of claim 14, wherein the network authorizing element comprises a mobile positioning center (MPC).

18. The mobile station of claim 14, wherein the positioning assistance server comprises position determining equipment (PDE).

19. The mobile station of claim 14, wherein the means for receiving the mobile terminated authorization request from the network authorizing element using the first positioning protocol comprises means for receiving a message according to an MS-MPC protocol and/or wherein the means for initiating the location determination session using the second positioning protocol comprises means for initiating a mobile originated IS-801 session.

20. The mobile station of claim 14, wherein the network authorizing element authorizes the location determination session using one or more of an authorization, security information for authentication and privacy, billing information, and agreement between a party to be billed and a billing entity.

* * * * *